United States Patent [19]

Helm

[11] 3,939,723
[45] Feb. 24, 1976

[54] DRIVE FOR ROTATABLE CUTTER MECHANISMS

[75] Inventor: Herbert W. Helm, Hollidaysburg, Pa.

[73] Assignee: F. L. Smithe Machine Company, Inc., Duncansville, Pa.

[22] Filed: Oct. 16, 1974

[21] Appl. No.: 515,534

[52] U.S. Cl............................ 74/401; 74/242.11 A
[51] Int. Cl.[2]...................... F16H 35/08; F16H 7/12
[58] Field of Search ............ 74/401, 402, 403, 395, 74/242.11 A

[56] References Cited
UNITED STATES PATENTS
2,444,773  7/1948  Gondek ................................. 74/401

Primary Examiner—Leonard H. Gerin
Attorney, Agent, or Firm—Stanley J. Price, Jr.

[57] ABSTRACT

A pair of rotatable cutter mechanisms are positioned on opposite sides of a moving web and are arranged upon rotation of the cutter shafts to cut notches in the side edges of the moving web. The cutter shafts are rotatably driven by a drive mechanism that includes a pair of endless timing belts connected to the cutter shafts. One of the timing belts is reeved about a drive pulley that is non-rotatably connected to a helical gear. The main drive shaft has a helical gear that meshes with the helical gear connected to the pulley. The pair of timing belts are drivingly connected to each other by means of a pair of meshing helical gears connected to separate pulleys associated with the respective timing belts. Phase adjustment of both of the cutter mechanisms is accomplished by axially moving the helical gears connected to the pulley and main drive shaft while the helical gears remain in meshing relation with each other. The phase adjustment between the two cutter mechanisms is accomplished by moving the second pair of meshing helical gears axially relative to each other while remaining in meshing relation to rotatably displace one helical gear relative to the other and thus adjust the phase relation between the pairs of rotating cutter mechanisms.

3 Claims, 2 Drawing Figures

DRIVE FOR ROTATABLE CUTTER MECHANISMS

BACKGROUND OF THE INVENTION

1. Field of the Invention

This invention relates to a drive for rotatable cutter mechanisms and more particularly to a drive for a pair of rotatable cutter mechanisms arranged to cut different length notches in a moving web.

2. Description of the Prior Art

Rotating blade type cutting mechanisms for cutting notches in a moving web are known. British Patent 850,797 entitled "Improvements In Or Relating To Apparatus For Slotting The Edges Of Running Webs" discloses a cutting mechanism that includes a pair of rotatable cutting knives that are separately driven by means of meshing gears connected to a common drive shaft. The cutting sequence of the pair of tandem knives is adjusted by adjusting the relative position of the cutting knives to the drive gears.

U.S. Pat. No. 3,782,233 discloses a rotatable cutter mechanism that includes pairs of rotatable cutting knives positioned on opposite sides of the web and arranged to cut different length notches in the moving web material. The cutting knives are non-rotatably secured to rotatable shafts mounted on a platform that are, in turn, connected through coupling devices to gear boxes which, in turn, are connected to a common drive shaft.

German OLS 1,769,688 entitled "Cutting Arrangement For Envelope And Bag Machines" also discloses apparatus for cutting notches in the sides of an endless web.

The known rotating blade type cutters are all mechanically connected to a common drive shaft so that it is not possible to adjust the phase register between the cutting operation of the knives and the relative position of the web while the web is moving and with the direct mechanical connections substantial backlash is present that limits the accuracy of the notches cut in the side edges of the web.

There is a need for a drive mechanism that is associated with rotatable cutter mechanisms that can adjust phase register between the knives and the web while the cutter mechanism is in operation. There is also a need for apparatus to reduce the backlash to provide more accurate phase register during operation of the cutting mechanism and provide for a quicker size change.

SUMMARY OF THE INVENTION

In accordance with the present invention the drive mechanism for the rotatable cutter mechanism that is arranged to cut notches in a moving web includes a cutter shaft rotatably mounted on a platform. The cutter mechanism is secured to the cutter shaft and arranged upon rotation of the cutter shaft to cut notches in a web that is moving on the platform. A drive shaft is rotatably mounted adjacent to the cutter shaft. The drive shaft has a helical gear mounted thereon. A second helical gear is arranged in meshing relation with the first helical gear and a drive means drivingly connects the second helical gear to the cutter shaft so that the cutter shaft rotates in timed relation with the second helical gear. A means is provided for moving one of the helical gears axially relative to the other helical gear during the rotation of the drive shaft to thus change or adjust the phase register of the cutter mechanism. Preferably the second helical gear has a longitudinal dimension greater than that of the first helical gear so that relative movement therebetween displaces radially or peripherally one of the helical gears relative to the other helical gear while the helical gears remain in meshing relation with each other.

The drive means connecting the second helical gear with the rotatable cutter shaft includes a plurality of pulleys; one pulley being secured to the rotatable cutter shaft through a flexible coupling and another pulley secured to and rotatable with the second helical gear. An endless flexible timing belt is reeved about the respective pulleys to thus rotate the cutter shaft in timed relation with the drive shaft.

Where pairs of cutter mechanisms are positioned on opposite sides of the web and arranged to cut notches in both sides of the web a second drive means is provided for the second cutter mechanism. The drive means includes a helical gear that meshes with a helical gear forming a portion of the drive train for the first cutter mechanism. The second pair of meshing helical gears are also adjustable axially relative to each other while in meshing relation for phase adjustment of the second cutter mechanism. With the above arrangement it is now possible to provide a relatively simple and inexpensive drive for pairs of cutter mechanisms positioned on opposite sides of the web. The drive mechanism includes the features of quick change and reduced backlash. Further, it is now possible with the pairs of helical gears included in the drive mechanism to adjust the phase register of both of the cutter mechanisms and also to adjust the phase register of the second cutter mechanism.

Accordingly, the principal object of this invention is to provide a drive mechanism for rotatable cutter mechanisms that includes phase register adjustment for the cutter mechanism while the drive mechanism is in operation.

Another object of this invention is to provide an inexpensive drive mechanism for a rotatable cutter with reduced backlash in the drive mechanism.

These and other features of this invention will be more completely disclosed and described in the following specification, the accompanying drawings and the appended claims.

DESCRIPTION OF THE PREFERRED EMBODIMENTS

Figure 1:
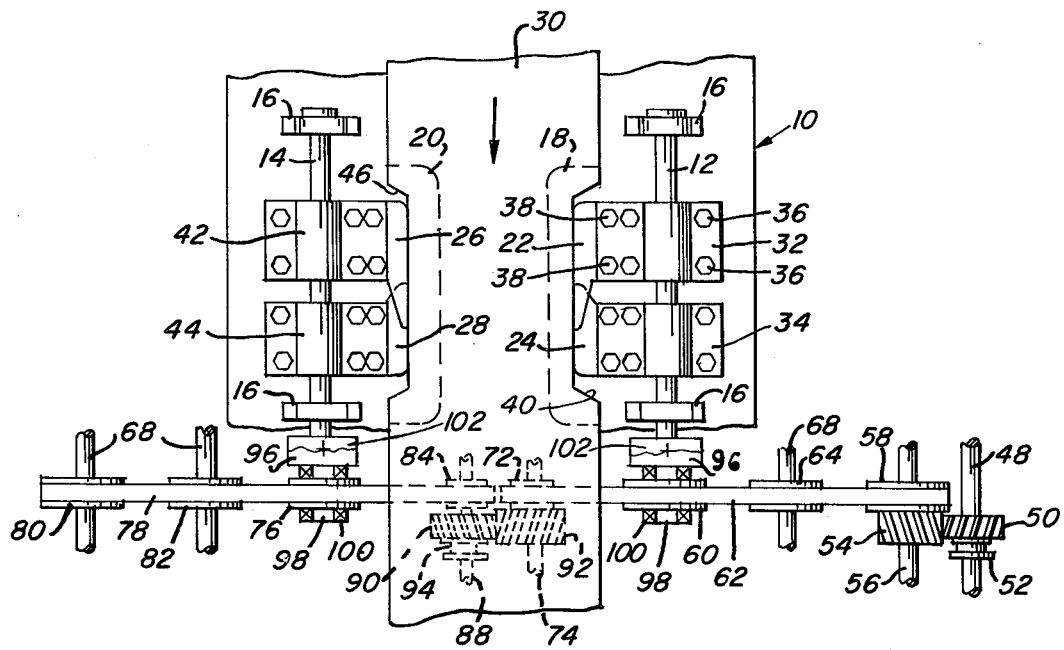
FIG. 1 is a top plan view of a rotating cutter mechanism arranged to cut the side edges of a moving web and the drive mechanism associated therewith.

The rotatable cutter mechanism is similar to that illustrated and described in U.S. Pat. No. 3,782,223 and includes a platform designated by the numeral 10 on which a pair of rotatable drive shafts 12 and 14 are rotatably supported in pillow block type bearings 16. Suitable means may be provided to adjustably move the cutter shafts 12 and 14 toward and away from each other to control the size of the notches cut in the sides of the endless web as later described. The platform or table portion 10 has fixed cutters 18 and 20 which mate with blades 22, 24, 26 and 28 of the rotatable cutters. An endless web 30 is arranged to be conveyed along the upper portion of the table or platform 10 and move in the direction indicated by the arrow in FIG. 1.

One of the rotatable cutter mechanisms on a side of the web 30 includes blade holders 32 and 34 non-rotatably secured to the cutter shaft 12 by means of bolts 36. The blades 22 and 24 are secured to the blade holders 32 and 34 by the bolts 38. With this arrangement the blades 22 and 24 secured to the blade holders 32 and 34 rotate with the shaft 12 and as the blades rotate past the fixed cutter 18 a notch 40 is formed in the side edges of the web 30. The other cutter mechanism located on the opposite side of web 30 is of substantially the same construction and includes blade holders 42 and 44 non-rotatably secured to the cutter shaft 14. With this arrangement notch 46 is formed on the opposite side of the web 30 by rotation of the cutter blades 26 and 28.

As is discussed in U.S. Pat. No. 3,782,233 the relative angular displacement of the blade 22 to the blade 24 and similarly the blade 26 to the blade 28 determines the length of the notch cut by the respective cutter mechanisms on the opposite sides of the web 30.

One of the principal uses of the above described cutter mechanism is to form the side edges of the seal flap and bottom flap of adjacent envelope blanks that are thereafter severed from the web. It is essential in forming the side edges of the seal flap and bottom flap that the cutter mechanisms positioned on opposite sides of the web be in accurate phase register so that the side edges of the bottom flap, for example, on opposite sides of the web are cut at the same transverse location on the web. This phase register between the cutter mechanisms on opposite sides of the web is essential to obtain accurate and symmetrically formed envelope blanks. It is also necessary to control the speed of the cutter mechanisms and adjust the phase register of the cutter mechanisms with the remaining components of the envelope making machine.

The drive mechanism for the rotatable cutter devices includes a main drive shaft 48 that is connected to the envelope machine drive and rotates at a preselected speed relative to the remaining components of the envelope making machine. The main drive shaft 48 has a helical gear 50 non-rotatably mounted thereon. The helical gear 50 has a collar member 52 in which a suitable fork type device may be positioned to move the helical gear 50 axially on the drive shaft 48. The helical gear 50 meshes with a second helical gear 54 that is mounted on shaft 56. The shafts 48 and 56 are suitably supported in the frame portion of the envelope machine and the supports are not illustrated. It should be understood, however, that any conventional shaft support means may be employed. Throughout the specification various pulleys and gears in the drive mechanism will also be discussed as mounted on suitable shafts. These shafts are suitably supported in the frame mechanism of the envelope making machine and the supports are not illustrated.

A pulley member 58 is secured to the helical gear 54 and is rotatable therewith and is also secured to shaft 56. The cutter shaft 12 suitably supported in bearings 16 is connected through a flexible coupling 96 to a pulley 60. The flexible coupling 96 has a shaft end portion 98 which is mounted in bearings 100 with the pulley 60 therebetween.

Figure 2:
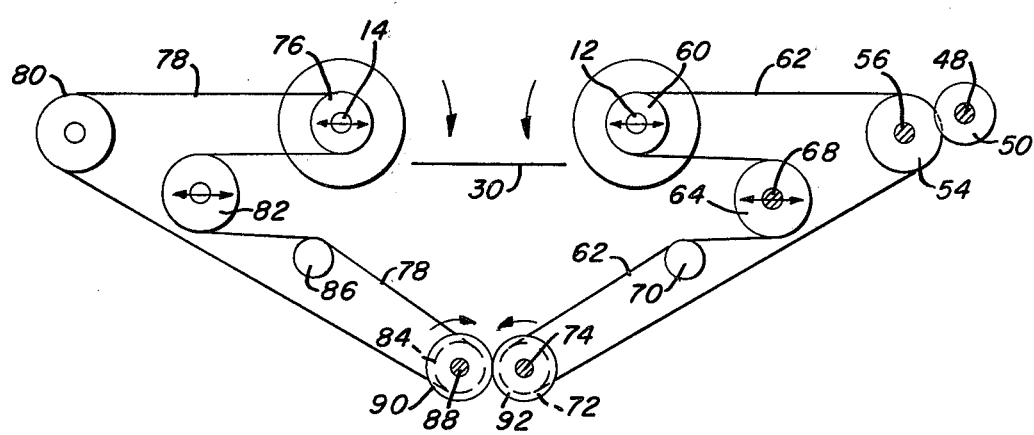
FIG. 2 is a schematic view in elevation of the drive mechanism.

The endless flexible timing belt 62 is reeved about the pulleys 58 and 60 to transmit rotation from the shaft 48 through the flexible coupling 96 to the cutter shaft 12. As previously indicated, the cutter shaft 12, flexible coupling 96 and pulley 60 are arranged to be adjusted horizontally as indicated by the arrows in FIG. 2.

A take-up pulley 64 is mounted on shaft 68 and the timing belt 62 is reeved therearound. The timing belt 62 abuts an idler pulley 70 and is also reeved about a transfer pulley 72 mounted on shaft 74. The pulleys 60 and 64 are connected to each other by suitable connecting means (not shown) so that both pulleys move the same distance in the same direction during adjustment of the cutter shaft. With this arrangement once the timing belt is tensioned it remains tensioned no matter how much the cutter is adjusted due to this arrangement of the pulleys and the pulleys being interconnected with each other for equal movement in the same direction. With this arrangement rotation of drive shaft 48 is transmitted through the meshing helical gearing 50 and 54 and timing belt 62 to the pulley 60 which, in turn, transmits rotation through the flexible coupling 96 to the cutter shaft 12.

The flexible coupling 96 which may be of any conventional construction has a pivot point 102 about which the cutter shaft 12 can pivot relative to the shaft 98 to provide fing angular adjustments of the cutting knives 22 and 24 on the cutter shaft 12.

The rotation of the timing belt 62 is transferred through the transfer pulley 72 to the cutter mechanism located on the opposite side of the web 30.

The cutter shaft 14 is connected through a similar flexible coupling 96 to a pulley 76 suitably mounted in separate bearings 100. The pulley 76 has a diameter substantially the same as the diameter of pulley 60 associated with the other cutter shaft 12. A timing belt 78 is reeved about idler pulley 80, take-up pulley 82, transfer pulley 84 and idler pulley 86. The transfer pulley 84 is mounted on a shaft 88 and is connected to a helical gear 90. The helical gear 90 meshes with helical gear 92 mounted on shaft 74. The idler pulley 80 and take-up pulley 82 are mounted on suitable shafts and the pulley 76 mounted on the flexible coupling shaft 98 is connected to the take-up pulley 82 so that both pulleys 76 and 82 move the same distance in the same direction during adjustment of the cutter shaft 14. This maintains the same tension on the timing belt 78. With this arrangement rotation of pulley 72 by timing belt 62 is transmitted through meshing helical gears 90 and 92 to the transfer pulley 84. The helical gear 90 has a longitudinal dimension smaller than the helical gear 92 and includes a collar 94 which permits longitudinal or axial movement of helical gear 90 relative to helical gear 92 while the gears 90 and 92 are in meshing relation with each other.

The adjustment of the phase register of both of the cutter mechanisms, i.e. the cutter mechanism connected to shaft 12 and the other cutter mechanism connected to shaft 14, is accomplished by moving the helical gear axially on the shaft 48 while the helical gear 50 remains in meshing relation with the helical gear 54. The axial movement of the helical gears relative to each other provides peripheral displacement of one gear relative to the other and thus adjusts the phase register of both of the interconnected cutter mechanisms. It will be appreciated that the phase register adjustment of both of the cutter mechanisms may be accurately controlled during the operation of the drive mechanism and the envelope machine.

The phase adjustment of the cutter mechanism connected to the cutter shaft 14 is accomplished by moving the helical gear 90 axially relative to helical gear 92 to thus provide peripheral displacement between the helical gears 90 and 92 and a phase adjustment between the drives for the cutter mechanism associated with shaft 12 and the other cutter mechanism associated with shaft 14. The above described arrangement permits adjustment of the phase register for both of the cutters by moving the helical gears 50 and 54 axially relative to each other and also phase adjustment between the pairs of cutter mechanisms by moving the meshing helical gears 90 and 92 relative to each other. The arrangement of the pulleys further permits the timing belts to remain tensioned during adjustment of the cutter shafts with the cutter knives mounted thereon. The pulley associated with the cutter shaft and the take-up pulley are movable linearly in opposite directions. The above pulleys are suitably interconnected to each other so that both pulleys move the same distance in the same direction and thus maintain the same tension on the timing belts during adjustment of the cutter shafts.

According to the provisions of the patent statutes, I have explained the principle, preferred construction and mode of operation of my invention and have illustrated and described what I now consider to represent its best embodiments.

I claim:

1. Apparatus for providing automatic take-up of a timing belt comprising,
   a drive shaft mounted for planar linear movement in opposite directions,
   a drive shaft fixedly positioned and rotatably mounted adjacent to said driven shaft,
   a pulley mounted on said driven shaft,
   a drive pulley mounted on said drive shaft,
   a take-up pulley rotatably mounted between said drive pulley and said driven pulley, said take-up pulley mounted for planar linear movement in opposite directions,
   an endless timing belt reeved about said drive pulley, said driven pulley and said take-up pulley so that rotation of said drive shaft transmits rotation to said driven shaft, and
   means connecting said driven pulley to said take-up pulley so that both said driven pulley and said take-up pulley move the same linear distance in the same plane so that said driven shaft may be adjusted in said linear plane while said timing belt maintains the same tension.

2. Apparatus for providing automatic take-up of a timing belt as set forth in claim 1 which includes,
   a flexible coupling between said driven shaft and said driven pulley, and flexible coupling providing pivot means to adjust said driven shaft axially relative to said driven pulley.

3. A drive mechanism for a pair of shafts comprising,
   a pair of driven shafts rotatably mounted in spaced relation to each other,
   a drive shaft rotatably mounted adjacent to one of said driven shafts,
   separate pulleys non-rotatably connected to both of said driven shafts and said drive shaft,
   a pair of connecting shafts mounted in spaced relation to each other and to said driven shafts,
   a pair of gears non-rotatably mounted on said pair of connecting shafts, said gears meshing with each other,
   a pair of pulleys non-rotatably mounted on said connecting shafts,
   a first endless timing belt reeved about said pulley on said drive shaft, said pulley mounted on one of said driven shafts and said pulley mounted on one of said connecting shafts, and
   a second endless timing belt reeved about said pulley mounted on said other driven shaft and said pulley mounted on said other connecting shaft,
   said timing belts arranged through said meshing gears on said connecting shafts to rotate said driven shafts in timed relation to each other upon rotation of said drive shaft.

* * * * *